United States Patent
Baldauf et al.

(10) Patent No.: US 9,840,643 B2
(45) Date of Patent: Dec. 12, 2017

(54) HOT-GLUE APPLICATION SYSTEM AND METHOD FOR CONTROLLING AND MONITORING THE HOT-GLUE APPLICATION SYSTEM

(75) Inventors: Dieter Baldauf, Ratingen (DE); Swen Schneider, Uedem (DE)

(73) Assignee: BAUMER HHS GMBH, Krefeld (DE)

( * ) Notice: Subject to any disclaimer, the term of this patent is extended or adjusted under 35 U.S.C. 154(b) by 1672 days.

(21) Appl. No.: 12/310,453

(22) PCT Filed: Aug. 7, 2007

(86) PCT No.: PCT/EP2007/006956
§ 371 (c)(1),
(2), (4) Date: Feb. 25, 2009

(87) PCT Pub. No.: WO2008/022708
PCT Pub. Date: Feb. 28, 2008

(65) Prior Publication Data
US 2009/0285983 A1    Nov. 19, 2009

(30) Foreign Application Priority Data
Aug. 25, 2006   (DE) .................. 10 2006 039 839

(51) Int. Cl.
| | |
|---|---|
| *B05C 11/00* | (2006.01) |
| *C09J 5/00* | (2006.01) |
| *B05C 11/10* | (2006.01) |
| *B05C 5/00* | (2006.01) |
| *B05C 5/02* | (2006.01) |

(52) U.S. Cl.
CPC .............. *C09J 5/00* (2013.01); *B05C 5/001* (2013.01); *B05C 11/1002* (2013.01); *B05C 11/1007* (2013.01); *B05C 11/1042* (2013.01); *B05C 5/02* (2013.01); *B05C 5/0245* (2013.01)

(58) Field of Classification Search
CPC ......... B05C 5/0245; B05C 5/02; B05C 5/001; B05C 11/1002; B05C 11/1007
USPC ...... 118/663, 665, 697, 712; 427/207.1, 208, 427/208.2
See application file for complete search history.

(56) References Cited

U.S. PATENT DOCUMENTS

| | | |
|---|---|---|
| 5,604,681 A | 2/1997 | Koeninger |
| 5,700,322 A | 12/1997 | Fort |
| 5,718,767 A | 2/1998 | Crum et al. |
| 6,125,868 A * | 10/2000 | Murphy et al. ............ 137/1 |
| 6,758,423 B1 | 7/2004 | Perkins et al. |
| 6,843,628 B1 | 1/2005 | Hoffmeister et al. |

(Continued)

FOREIGN PATENT DOCUMENTS

| | | |
|---|---|---|
| DE | 30 50 226 C1 | 2/1985 |
| DE | 103 35 035 A1 | 3/2005 |
| DE | 10 2004 050 383 A1 | 4/2006 |
| EP | 0 772 106 A1 | 5/1997 |
| GB | 2 142 172 A | 1/1985 |
| JP | 05-022054 | 3/1993 |

(Continued)

OTHER PUBLICATIONS

Nordson Corporation: "ProLink™ User's Guide", Part 107 042A, pp. 1-202 (Sep. 1996).

*Primary Examiner* — Xiao Zhao
(74) *Attorney, Agent, or Firm* — Norman B. Thot

(57) ABSTRACT

In the hot-glue application system with a melter and components connected thereto, such as one or more heatable feeder pipes and one or more heatable application valves, the components contain a machine-readable and preferably also machine writable data storage medium.

10 Claims, 3 Drawing Sheets

(56) References Cited

U.S. PATENT DOCUMENTS

| | | |
|---|---|---|
| 2001/0037670 A1* | 11/2001 | Boger et al. .................. 73/1.72 |
| 2002/0030100 A1 | 3/2002 | Katayanagi et al. |
| 2002/0030581 A1* | 3/2002 | Janiak et al. ................ 340/5.53 |
| 2003/0080156 A1 | 5/2003 | Jeter et al. |
| 2003/0231020 A1* | 12/2003 | Yonezawa et al. ........... 324/326 |
| 2004/0011817 A1* | 1/2004 | Colangelo et al. ........ 222/146.5 |
| 2005/0010323 A1 | 1/2005 | Cocciadiferro et al. |
| 2005/0095359 A1* | 5/2005 | Pallante et al. ............ 427/207.1 |
| 2005/0167505 A1 | 8/2005 | Kim et al. |
| 2006/0125607 A1 | 6/2006 | Gunther et al. |
| 2006/0244565 A1 | 11/2006 | Friedrich et al. |
| 2006/0287757 A1 | 12/2006 | Brodin et al. |
| 2007/0079755 A1 | 4/2007 | Strack et al. |

FOREIGN PATENT DOCUMENTS

| | | |
|---|---|---|
| JP | 07-050467 A | 2/1995 |
| JP | 7-171465 A | 7/1995 |
| JP | 9-292068 A | 11/1997 |
| JP | 11-276946 A | 10/1999 |
| JP | 2003-243286 A | 8/2003 |
| JP | 2004-025505 A | 1/2004 |
| JP | 2004-505211 A | 2/2004 |
| JP | 2005-507768 A | 3/2005 |
| JP | 2005-218084 A | 8/2005 |
| WO | WO 00/63565 A1 | 10/2000 |
| WO | WO 00/72977 A2 | 12/2000 |
| WO | WO 2002/061514 A1 | 8/2002 |
| WO | WO 2004/081881 A1 | 9/2004 |
| WO | WO 2005/046884 A2 | 5/2005 |
| WO | WO 2005/075088 A2 | 8/2005 |

* cited by examiner

HOT-GLUE APPLICATION SYSTEM AND METHOD FOR CONTROLLING AND MONITORING THE HOT-GLUE APPLICATION SYSTEM

CROSS REFERENCE TO PRIOR APPLICATIONS

This application is a U.S. National Phase application under 35 U.S.C. §371 of International Application No. PCT/EP2007/006956, filed on Aug. 7, 2007 and which claims benefit to German Patent Application No. 10 2006 039 839.4, filed on Aug. 25, 2006. The International Application was published in German on Feb. 28, 2008 as WO 2008/022708 A1 under PCT Article 21(2).

FIELD

The present invention provides a hot glue application system and a method for automatically controlling and monitoring the hot glue application system.

BACKGROUND

Hot glue, also known as hot melt adhesive or hot melt, is used in a wide variety of industrial applications for adhesively bonding materials or products with each other.

A state-of-the-art hot glue application system (see FIG. 1) generally comprises a melter 100, one or more heatable feed hoses 200, and one or more heatable application valves 300.

The melter 100 comprises the following components:

A heatable tank 110, into which the hot glue is charged in the solid state in granulated form or block form. The heatable tank 110 liquefies the hot glue and serves as a hot glue reservoir. A heater 111, which can have one or more heating zones, heats the tank to a sufficiently high temperature to liquefy the hot glue. To maintain the operating temperature, the actual temperature is determined for the automatic control system by one or more temperature sensors 112, depending on the number of heating zones.

A pump 120, which pumps the melted hot glue to the connected consumers.

A pressure relief valve 130, which relieves the consumer side when the operating pressure is exceeded and returns the hot glue to the tank 110

A filter 140, which prevents particles of a size that could lead to clogging of the application valves from reaching the consumer side.

A distributor 150, which has several hydraulic connections, to which heatable feed hoses can be connected for supplying hot glue.

An electronic control unit 170 with a multizone automatic temperature control and monitoring unit 171 and a user interface and display unit 172. The multizone automatic temperature control and monitoring unit 171 provides for attaining and maintaining the set temperature of the tank heating zones and, via several external connections, for attaining and maintaining the set temperature for the connected heatable feed hoses and heatable application valves and for monitoring them.

The heatable feed hoses 200 are for supplying the application valves 300 with liquid hot glue. They are heated by a heater 210 to maintain the hot glue supplied by the melter 100 in the liquid state. To maintain the operating temperature, the actual temperature is determined by the temperature sensor 112 and sent to the control unit 170 for automatic control.

The heatable application valves 300 have an electrically or electropneumatically operated closing plug and a nozzle for metering and positioning a portion of hot glue 20 to be applied to the product to be bonded. They are heated by a heater 310 in order to liquefy the hot glue supplied by the melter 100 through the heatable feed hoses to such an extent that it can be applied through the nozzle with the required viscosity and temperature for the given application. To maintain the operating temperature, the actual temperature is determined by the temperature sensor 320 and supplied to the control unit 170 for automatic control.

Depending on the application, a variable number of heatable feed hoses 200 and heatable application valves 300 with variable heating capacity and automatic control response can be connected to the melter 100. The configuration of the hot glue application system can also be frequently changed after the initial installation if different products are being bonded, the hot glue is changed, or a failed component is replaced by a component with different characteristics from the failed component.

The heating time of the hot glue application system and the control deviation of the operating temperature from the adjusted set value of the individual heating circuits are important application parameters, which directly affect productivity and operational reliability of such systems. To optimize the automatic control response, it is necessary that the multizone automatic temperature control and monitoring unit 171 has at its disposal the automatic control parameters, such as delay time and amplification factor, as well as other technical data, such as heating capacity and maximum temperatures, of all connected components.

It is well known that the multizone automatic temperature control and monitoring unit 171 should be designed in such a way that the automatic control parameters for the different connected components can be input manually.

However, the manual input of automatic control parameters is burdensome and prone to error when the components, the type of glue, or the products to be bonded are frequently changed.

Self-optimizing algorithms in digital controllers, which are started manually, cyclically, or during initialization of the control and automatically determine the automatic control parameters by test procedures, are state of the art. However, these algorithms are successful only if, during connection of a heating circuit, the deviation of the automatic control parameters from the current values is automatically detected, or if, during a reconnection, an optimization cycle is manually initiated in each case. The limiting values for the heating capacity and the operating temperature cannot be determined by this method. This is critical especially when a defect develops in the heating circuit during the operation or a defective component is connected, since the control unit then adjusts the automatic control response to the redetermined parameters without triggering an alarm. This can have a negative effect on the quality of the hot glue application and, if the maximum temperatures are exceeded, it can lead to serious safety risks. Furthermore, without knowledge of additional technical data on the connected components, the algorithms offer no possibility of optimizing the behavior of the hot glue application system as a whole, such as power consumption or total heating time.

Therefore, in previously known hot glue application systems, the electronic control unit 170 operates either with permanently set mean automatic control parameters and the maximum values for the heating capacity and operating temperature or with self-optimization that is to be manually initiated.

Furthermore, in previously known hot glue application systems, only the temperature sensors are monitored for short circuit and sensor failure, since as a rule only one type is used, whose data are permanently stored in the electronic control unit. The heaters are not monitored, since the manual input of the heating parameters is too burdensome, and the additional installation of sensors, such as current sensors, breaks the cost limits. This presents problems if, for example, a defective heater is replaced by a heater with different characteristics.

Another problem is that all of the components that are used have only a limited service life, and the failure of only one component can lead to the failure of the whole hot glue application system.

One well-known method for increasing the availability of an automated production system consists in preventive maintenance of the components of such a system. In this method, preventive repair or preventive component replacement is carried out on the basis of the trouble-free operating time that can be expected, which is obtained from statistical analysis or empirical testing. A prerequisite for organizing the preventive maintenance is the recording and availability of the current operating time of the individual components. To this end, all events that cause the operating time of the individual components to deviate from the operating time of the whole system must be documented in a logbook by manual entry, which is labor-intensive and prone to error. Therefore, in previously known hot glue application systems, only the operating time of the melter 100 is monitored. The operating time of the connected components is not automatically monitored.

In addition, in the previously known hot glue application systems, when limiting parameters in the components are exceeded, this is not recorded. Therefore, this information is not available for the diagnosis.

SUMMARY

An aspect of the present invention is to provide a method and a device for the application of hot glue, which provides for the safe gluing of the products to be bonded, even after a replacement of components, and which increases the operational reliability of the system.

In an embodiment, the present invention provides a hot glue application system with a melter and components connected to the melter. The components comprise at least one heatable feed hose and at least one heatable application valve. Each of the at least one heatable feed hose and each of the at each one heatable application valve comprises a machine-readable data storage medium.

BRIEF DESCRIPTION OF THE DRAWINGS

The present invention is described in greater detail below on the basis of embodiments and of the drawings in which.

DETAILED DESCRIPTION

Figure 1:
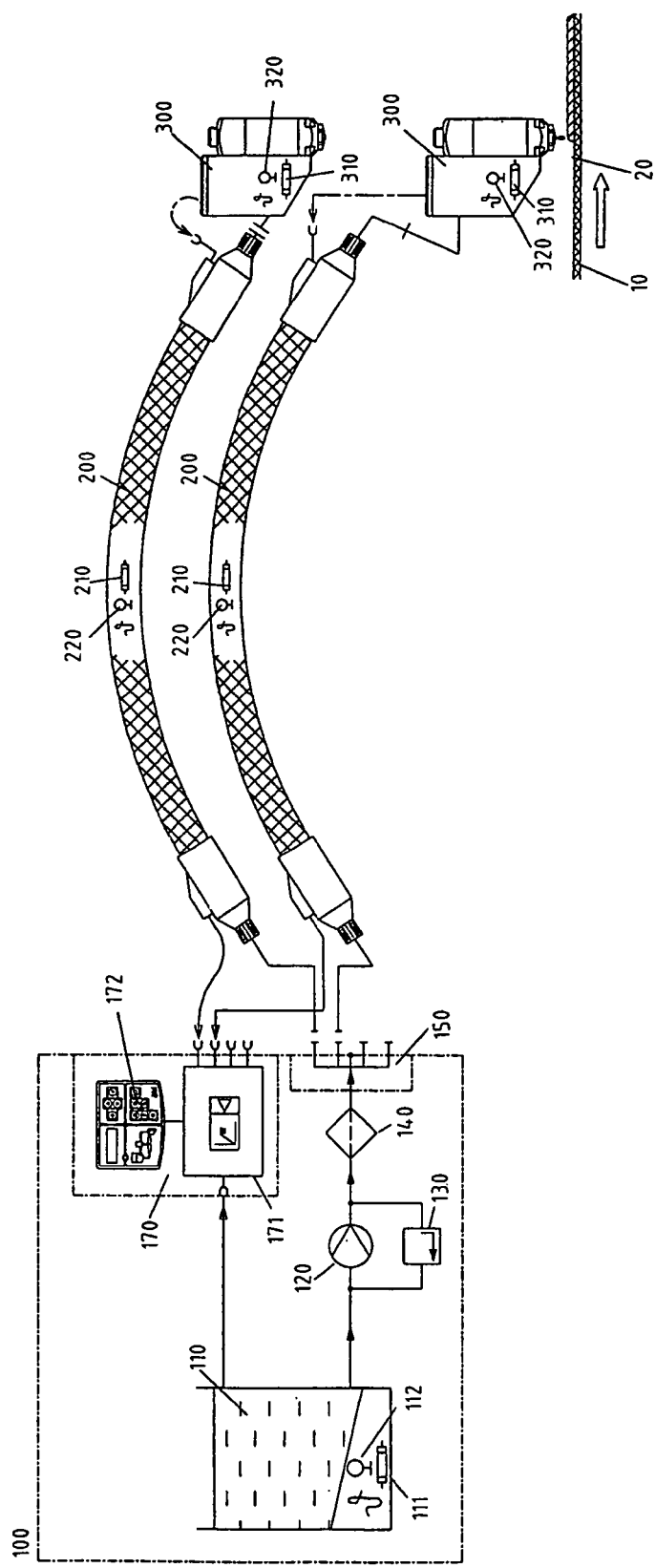
FIG. 1 shows a state-of-the-art hot glue application system.

As a result of the fact that, in the hot glue application system of the present invention, which comprises a melter and components connected to it, such as one or more heatable feed hoses and one or more heatable application valves, the components contain a machine-readable and, for example, a machine-writable data storage medium, the technical data necessary to automatically adjust the automatic control parameters for the multizone temperature control and monitoring can be stored in the components themselves. As a result of this measure, after one or more components are replaced, automatic control parameters are automatically adjusted by the multizone automatic temperature control and monitoring unit, so that all of the components of the hot glue application system are always operated at the optimum temperature. The refinement of the hot glue application system in accordance with the present invention is also especially suitable for the operational monitoring of the heating circuits connected to the automatic temperature control and monitoring unit, because for this purpose it is necessary that the control unit 170 have at its disposal the automatic control parameters and other technical data of all connected components, since only in this way is it possible, without additional sensor technology, to draw conclusions about the operability of the components. In this way, different types of temperature sensors can also be monitored for short circuit and sensor failure, and their calibration can be automatically adjusted, or partial short circuits of the heating coil or heating cartridges or installations of the application valves with excessive heat dissipation can be detected by evaluation of the temperature gradient at maximum level of the heating circuit if the standard values are stored in the control unit.

To evaluate the state of maintenance and to diagnose a hot glue system, it is necessary that the control unit 170 have information on the operating time and on the exceeding of limiting parameters of the melter 100, the connected heatable feed hoses 200, and the heatable application valves 300. In this regard, it is advantageous if this information is stored in the hoses and application valves themselves, so that after a repair and during connection of the components that were already in use, the previously attained operating time and the exceeding of established limiting parameters are automatically reported to the control unit 170. During operation, the control unit cyclically updates the elapsed time indicators contained in the components and the data memories for the limiting parameters. The operating time and the attained limiting parameters of the components can thus either be interrogated by the control unit 170 if the components are connected to the melter 100, or, after detachment from the melter 100, externally interrogated if the component, for example, is being subjected to repair. For this purpose, the data storage medium can, for example, be machine-writable.

To monitor the hot glue system, it is advantageous if the control unit 170 can exchange data with the higher-order control unit of the production system or with an external monitoring and diagnostic unit, so that the information that is acquired from the data storage media in the components is available for other entities. For this purpose, the unit has a connection for various field bus systems or the Internet to allow communication. Thus, if a component fails, for example, a remote diagnosis via the Internet can be arranged.

Previously known hot glue application systems have devices for exchanging data with other control units by field bus. However, the information content is very limited, since the data of the connected components are not available.

The drawings are schematic representations of an embodiment of a hot glue application system of the present invention.

Figure 2:
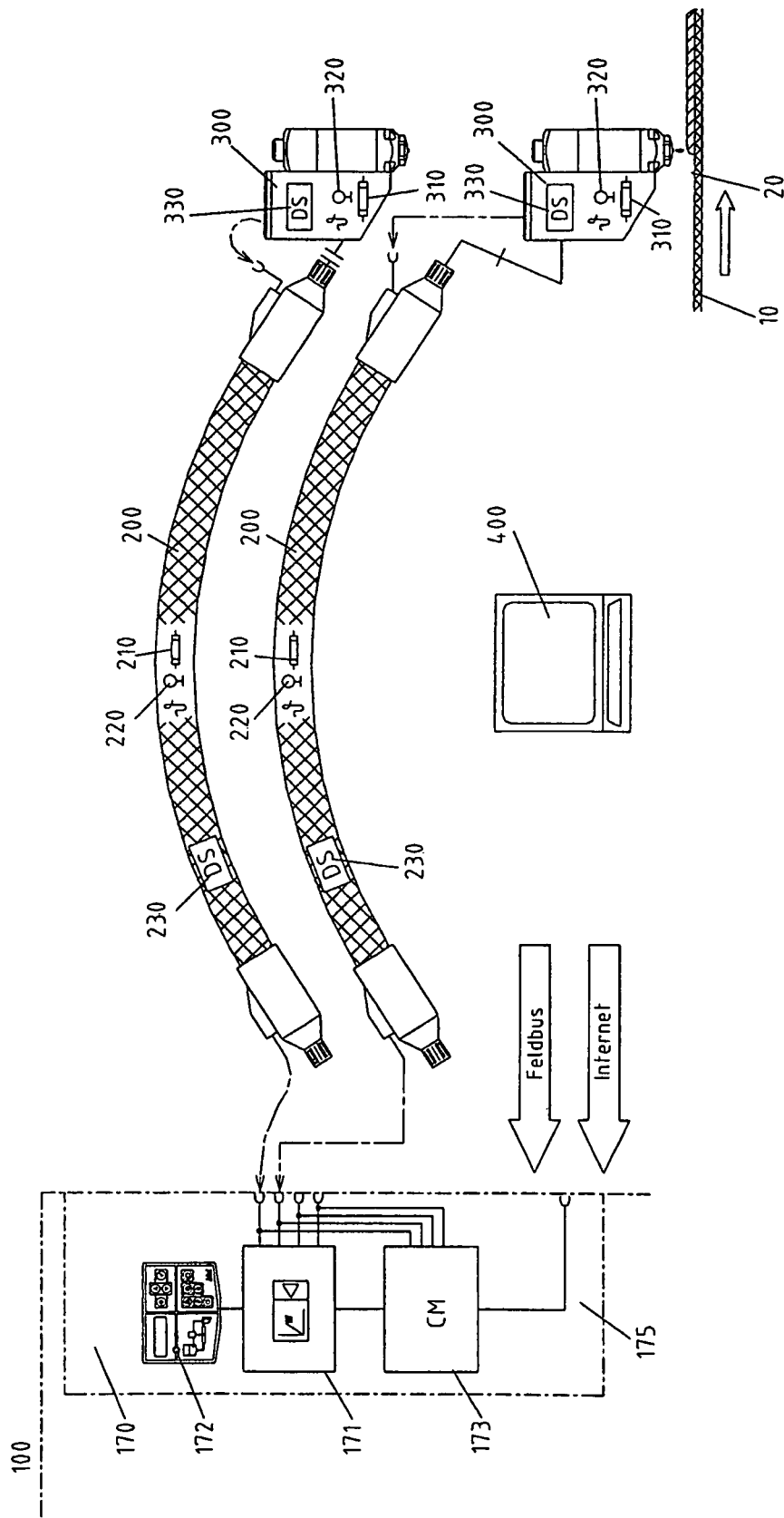
FIG. 2 shows a schematic representations of an embodiment of a hot glue application system of the present invention.
Figure 3:
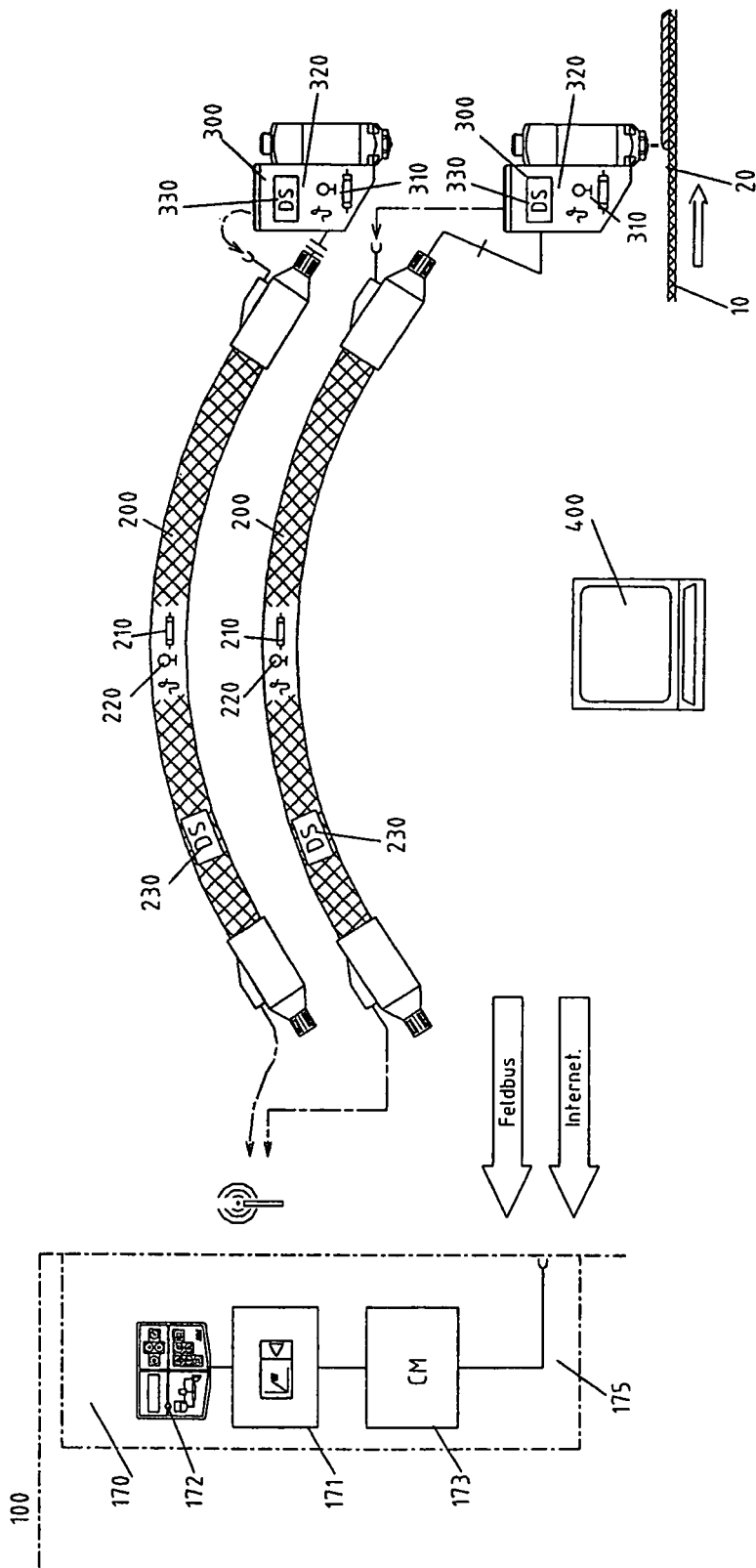
FIG. 3 shows a schematic representations of an embodiment of a hot glue application system of the present invention.

Besides the standard components for automatically controlling and monitoring the heating circuits of the melter 100, of the connected heatable feed hoses 200, and of the connected heatable application valves 300, the control unit 170 contains a hardwired device 173 (see FIG. 2) or a wireless device 174 (see FIG. 3) for communication with data storage media in the connected components. Each of the feed hoses 200 contains one or more machine-readable and, for example, machine-writable data storage media 230, and each of the application valves 300 contains one or more machine-readable and, for example, machine-writable data storage media 330, such as microprocessor systems, memory units, codings, or RFID, which transmit data wirelessly or by hardwire, optically, by radio, or by other suitable methods to the device 173 or the device 174 and are, for example, also able to receive data from these devices. These data storage media are written during the production or repair of the components by means of an external read/write unit 400 with the type-specific automatic control parameters, such as delay time and amplification factor, as well as other technical data, such as date of manufacture, average service life, heating capacity, and maximum temperatures. If the components are connected to the melter 100, the data storage media transmit their data to the device 173 or the device 174 during initialization and/or cyclically and when changes are made in the system configuration. These data are then used by the control unit 170 to organize optimum automatic control and monitoring of the connected components and the overall system. During initialization and/or cyclically and when changes are made in the system configuration, the device 173 or the device 174 in turn transmits data, such as maximum set parameters and actual parameters or elapsed operating hours, for storage on the data storage media of the connected components, which can then be advantageously used for diagnosis and preventive maintenance.

In addition, the communication device 173 or 174 has a connection 175 for data exchange with higher-order control units by field bus or with external monitoring units via the Internet. Thus, if a component failure occurs, for example, an alarm signal to the control station of the machine or a remote diagnosis via the Internet can be arranged.

The present invention is not limited to embodiments described herein; reference should be had to the appended claims.

What is claimed is:

1. A hot glue application system comprising:
   a control unit;
   a melter;
   a first heatable feed hose connected directly to the melter;
   a second heatable feed hose connected directly to the melter;
   a first heatable application valve connected directly to the first heatable feed hose; and
   a second heatable application valve connected directly to the second heatable feed hose,
   wherein,
   each of the first heatable feed hose and the second heatable feed hose comprise at least one data storage medium configured to be machine readable and to save technical data necessary to automatically adjust automatic control parameters for a multizone temperature control and monitoring so that each of the first heatable feed hose and the second heatable feed hose maintain a hot glue supplied by the melter in a liquid state,
   the first heatable feed hose and the second heatable feed hose do not comprise the control unit;
   each of the first heatable application valve and the second heatable application valve comprise at least one data storage medium configured to be machine readable and to save technical data necessary to automatically adjust automatic control parameters for a multizone temperature control and monitoring so that each of the first heatable application valve and the second heatable application valve maintain a hot glue supplied by the melter in a liquid state, and
   the first heatable application valve and the second heatable application valve do not comprise the control unit.

2. The hot glue application system as recited in claim 1, wherein the at least one data storage medium comprises at least one semiconductor memory.

3. A hot glue application comprising:
   a control unit;
   a melter;
   a first heatable feed hose connected directly to the melter; and
   a second heatable feed hose connected directly to the melter,
   wherein,
   each of the first heatable feed hose and the second heatable feed hose comprise at least one data storage medium configured to be machine readable and to save technical data necessary to automatically adjust automatic control parameters for a multizone temperature control and monitoring so that each of the first heatable feed hose and the second heatable feed hose maintain a hot glue supplied by the melter in a liquid state,
   the first heatable feed hose and the second heatable feed hose do not comprise the control unit,
   the control unit comprises a communication device,
   the melter comprises heating circuits,
   the control unit is configured to automatically control and monitor the heating circuits of the melter, and
   the communication device is configured to communicate with the at least one data storage medium.

4. The hot glue application system as recited in claim 3, wherein the communication between the communication device and the at least one data storage medium is carried out via a hardwired connection via at least one connection plug of the melter or via a wireless connection electromagnetically, magnetically, acoustically or optically.

5. The hot glue application system as recited in claim 3, wherein the communication device comprises a connection configured to exchange data with higher-order control units via a field bus or with an external monitoring unit via the Internet.

6. The hot glue application system as recited in claim 3, wherein the at least one data storage medium is further configured to be machine-writable.

7. The hot glue application system as recited in claim 3, wherein the at least one data storage medium comprises at least one semiconductor memory.

8. The hot glue application system as recited in claim 3, wherein the communication between the communication device and the at least one data storage medium is carried out via a hardwired connection via at least one connection plug of the melter or via a wireless connection electromagnetically, magnetically, acoustically or optically.

9. The hot glue application system as recited in claim 3, wherein the communication device comprises a connection configured to exchange data with higher-order control units via a field bus or with an external monitoring unit via the Internet.

10. A hot glue application system consisting of:
a control unit;
a melter;
a first heatable feed hose directly connected to the melter;
a second heatable feed hose directly connected to the melter;
a first heatable application valve connected directly to the first heatable feed hose; and
a second heatable application valve connected directly to the second heatable feed hose,
wherein,
each of the first heatable feed hose, the second heatable feed hose, the first heatable application valve, and the second heatable application valve comprise at least one data storage medium configured to be machine readable and to save technical data necessary to automatically adjust automatic control parameters for a multizone temperature control and monitoring so that a hot glue supplied by the melter is maintained in a liquid state, and
none of the first heatable feed hose, the second heatable feed hose, the first heatable application valve, and the second heatable application valve comprise the control unit.

* * * * *